United States Patent
Pike, Sr.

(10) Patent No.: US 11,919,810 B2
(45) Date of Patent: Mar. 5, 2024

(54) CLASS C FLY ASH-BASED CEMENTITIOUS MATERIALS, FLOWABLE FILL, CONCRETE, AND RELATED TECHNIQUES

(71) Applicant: VHSC, LTD., Tortola (VG)

(72) Inventor: Clinton W. Pike, Sr., Montgomery, TX (US)

(73) Assignee: Eco Material Technologies IP LLC, South Jordan, UT (US)

(*) Notice: Subject to any disclaimer, the term of this patent is extended or adjusted under 35 U.S.C. 154(b) by 72 days.

(21) Appl. No.: 17/480,464

(22) Filed: Sep. 21, 2021

(65) Prior Publication Data
US 2023/0090644 A1 Mar. 23, 2023

(51) Int. Cl.
| | | |
|---|---|---|
| C04B 18/10 | (2006.01) | |
| C04B 22/00 | (2006.01) | |
| C04B 24/04 | (2006.01) | |
| C04B 40/00 | (2006.01) | |
| C04B 103/00 | (2006.01) | |
| C04B 103/10 | (2006.01) | |

(52) U.S. Cl.
CPC ........ *C04B 18/106* (2013.01); *C04B 22/0013* (2013.01); *C04B 24/04* (2013.01); *C04B 40/0042* (2013.01); *C04B 2103/0067* (2013.01); *C04B 2103/10* (2013.01); *C04B 2201/52* (2013.01)

(58) Field of Classification Search
CPC ... C04B 18/106; C04B 22/0013; C04B 24/04; C04B 40/0042; C04B 2103/0067; C04B 2103/10; C04B 2201/52; Y02W 30/91
See application file for complete search history.

(56) References Cited

U.S. PATENT DOCUMENTS

| | | | |
|---|---|---|---|
| 4,349,386 A | 9/1982 | Davidovits | |
| 4,997,484 A * | 3/1991 | Gravitt | C04B 40/0039 106/DIG. 1 |
| 2020/0062645 A1* | 2/2020 | Gong | C04B 14/366 |

OTHER PUBLICATIONS

"Strätlingite A valid IMA mineral species", mindat.org and the Hudson Institute of Mineralogy, 1993-2023, https://www.mindat.org/min-3809.html, pdf. 5 pages.
EM Ecomaterial Technologies, 2023, https://ecomaterial.com/reference/, pdf 4 pages.
Greg Garrison, PhD., Jabrom Specialties, "Jabrom 4F 200", EM Ecomaterial Technologies, Technical Bulletin, Jul. 27, 2023, ecomaterial.com, pdf 2 pages.

* cited by examiner

*Primary Examiner* — Anthony J Green
(74) *Attorney, Agent, or Firm* — Hayes Soloway PC

(57) ABSTRACT

Class C fly ash-based cementitious materials, concretes, and related techniques are disclosed. In accordance with some embodiments, an activated class C fly ash-based cementitious material may be produced by intergrinding class C fly ash (e.g., classified to remove quartz and/or other contaminants and, thus, increase the reactive materials present), an activator, sodium citrate, borax, and a polycarboxylate material. The class C fly ash may have an amorphous glass content of about 60 wt % or more, a calcium oxide ($CaO_2$) content of about 20 wt % or more, and a quartz content of about 10 wt % or less. The activator may be a chemical which reacts with class C fly ash to form strätlingite structures therein when introduced with water. In some cases, the cementitious material may be provided as an all-in-one powder blend. In some cases, techniques disclosed herein may be utilized in providing a fast-setting flowable fill material.

19 Claims, 2 Drawing Sheets

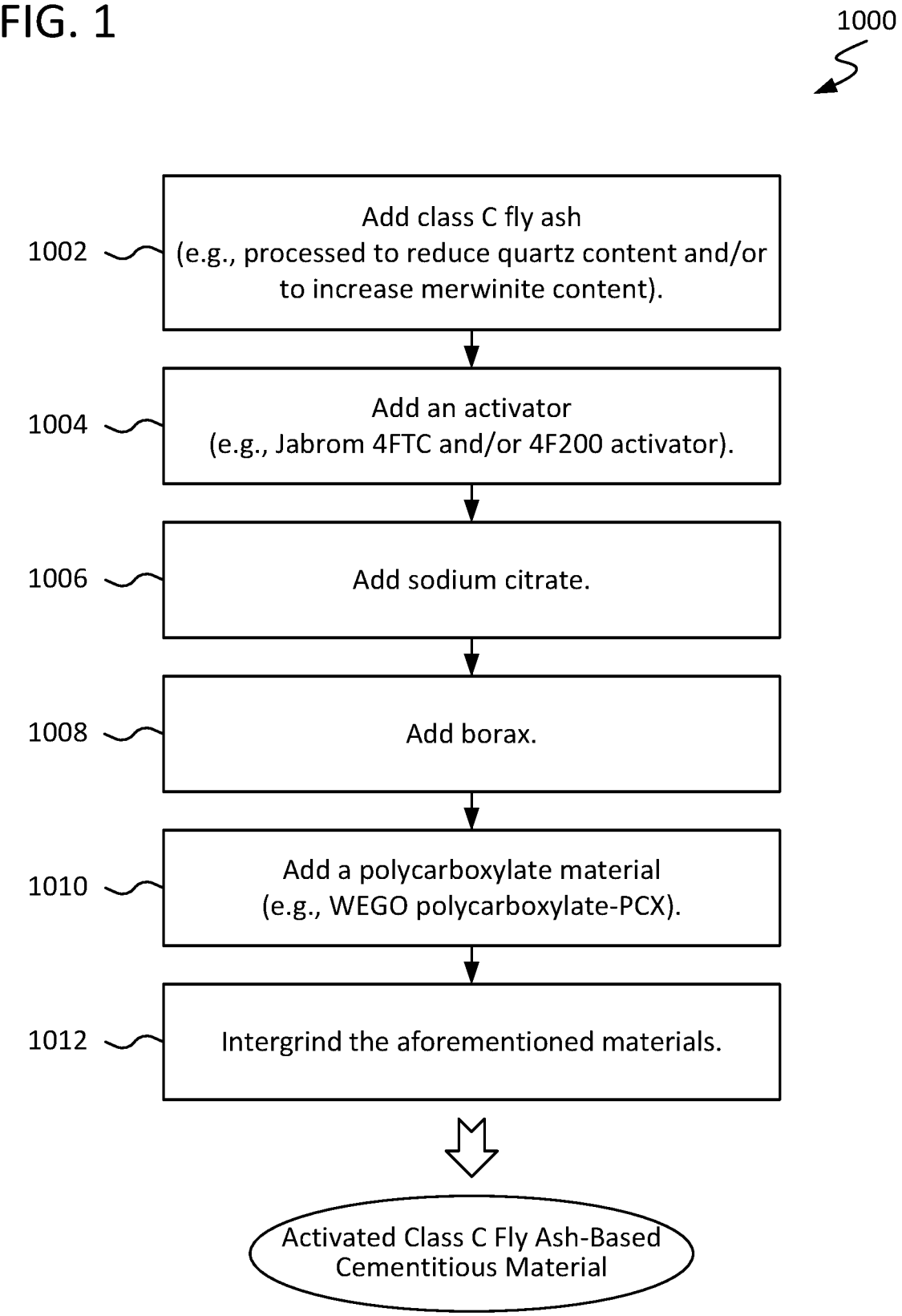

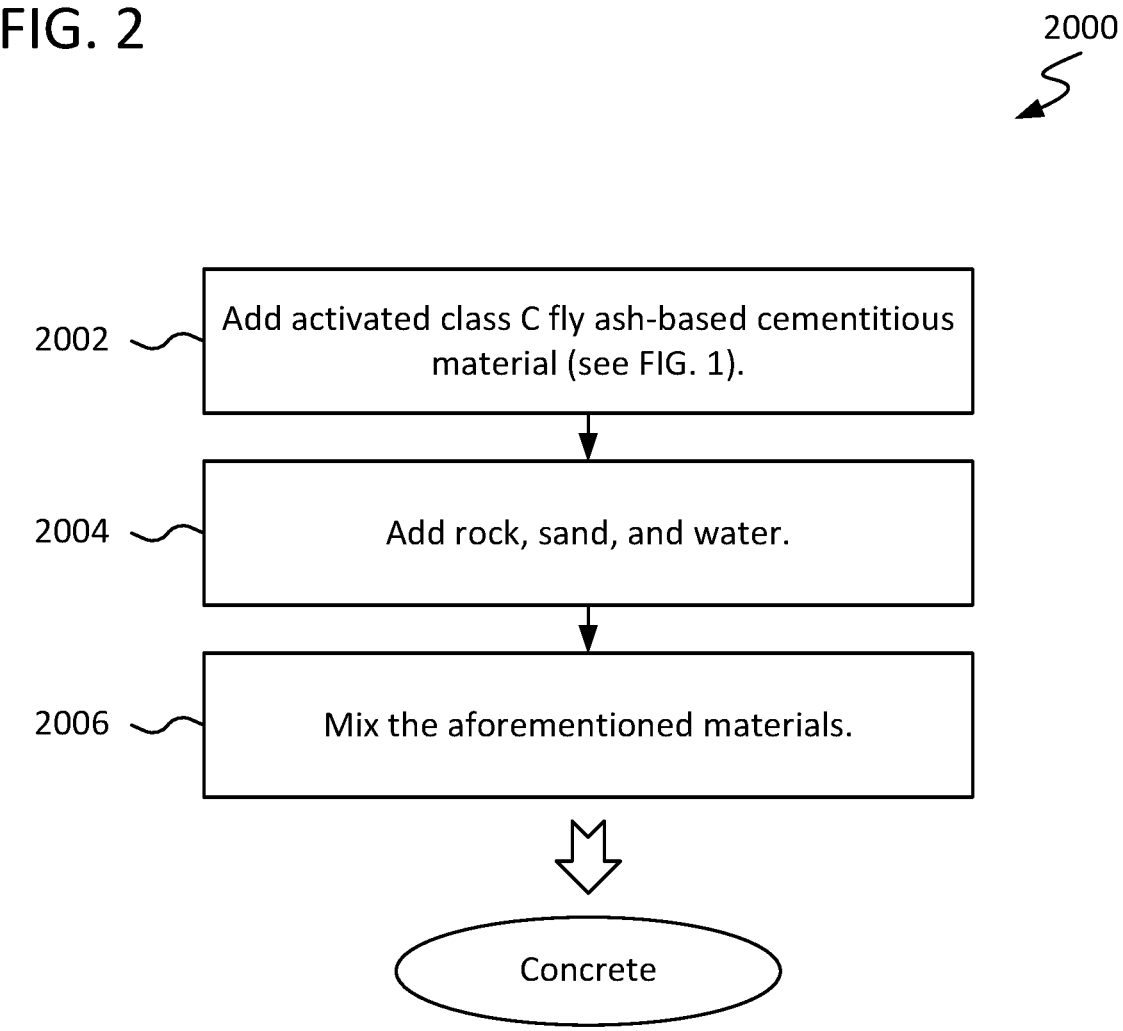

CLASS C FLY ASH-BASED CEMENTITIOUS MATERIALS, FLOWABLE FILL, CONCRETE, AND RELATED TECHNIQUES

FIELD OF THE DISCLOSURE

The present disclosure relates to cementitious materials and, more particularly, to class C fly ash-based cementitious materials, concretes, and techniques.

BACKGROUND

Class C fly ash is a byproduct of coal combustion processes utilized at coal-fired power stations and municipal power sources. As such, class C fly ash is not considered a "controlled productions material." Currently, most supplementary cementitious material (SCM) mixes are limited to only 20-25% class C fly ash content.

SUMMARY

The subject matter of this application may involve, in some cases, interrelated products, alternative solutions to a particular problem, and/or a plurality of different uses of a single system or article.

One example embodiment provides a method. The method includes producing a class C fly ash-based cementitious mixture. The class C fly ash-based cementitious mixture includes class C fly ash, an activator which reacts with the class C fly ash to form strätlingite structures therein when introduced with water, sodium citrate, borax, and a polycarboxylate material. In some cases, the class C fly ash constitutes about 90-99 wt % of the class C fly ash-based cementitious mixture. In some cases, the class C fly ash has: an amorphous glass content in the range of 60 wt % or more; a calcium oxide ($CaO_2$) content in the range of 20 wt % or more; and a quartz content in the range of 10 wt % or less. In some cases, the class C fly ash has: an amorphous glass content in the range of about 50-70 wt %; a calcium oxide ($CaO_2$) content in the range of about 15-30 wt %; and a quartz content in the range of about 5-20 wt %. In some cases, the activator includes Jabrom 4FTC activator. In some cases, the activator includes Jabrom 4F200 activator. In some cases, the activator constitutes about 0.25-1.0 wt % of the class C fly ash-based cementitious mixture. In some cases, the sodium citrate constitutes about 0.5-5.0 wt % of the class C fly ash-based cementitious mixture. In some cases, the borax constitutes about 0.1-0.5 wt % of the class C fly ash-based cementitious mixture. In some cases, producing the class C fly ash-based cementitious mixture involves intergrinding the class C fly ash, the activator, the sodium citrate, the borax, and the polycarboxylate material. In some instances, the intergrinding is performed for about 10±5 minutes. In some instances, the intergrinding is performed until a D90 particle size distribution in the range of about 30-60 μm is achieved for the class C fly ash-based cementitious mixture. In some instances, prior to the intergrinding, the class C fly ash is classified to remove at least one of quartz, an unreactive element, and a contaminant.

Another example embodiment provides a method including producing a concrete. The concrete includes class C fly ash-based cementitious mixture produced as above, water, and at least one of rock and sand. In some cases, the class C fly ash-based cementitious mixture constitutes about 10-17 wt % of the concrete. In some cases, the concrete has a water-cement (w/c) ratio in the range of about 0.23-0.4. In some cases, the concrete has a water-cement (w/c) ratio in the range of about 0.23-0.3. Another example embodiment provides a concrete product includes concrete produced as above.

Another example embodiment provides a method. The method includes producing a class C fly ash-based cementitious mixture. The class C fly ash-based cementitious mixture includes class C fly ash having: an amorphous glass content in the range of 60 wt % or more; a calcium oxide ($CaO_2$) content in the range of 20 wt % or more; and a quartz content in the range of 10 wt % or less. The class C fly ash-based cementitious mixture further includes an activator which reacts with the class C fly ash to form strätlingite structures therein when introduced with water, wherein the activator includes at least one of Jabrom 4FTC activator and Jabrom F4200 activator. The class C fly ash-based cementitious mixture further includes sodium citrate, borax, and a polycarboxylate material. Producing the class C fly ash-based cementitious mixture involves: classifying the class C fly ash to remove at least one of quartz, an unreactive element, and a contaminant; and intergrinding the class C fly ash, the activator, the sodium citrate, the borax, and the polycarboxylate material.

Another example embodiment provides a method including producing a concrete. The concrete includes class C fly ash-based cementitious mixture produced as above, water, at least one of rock and sand. The concrete has a water-cement (w/c) ratio in the range of about 0.23-0.3. Another example embodiment provides a concrete product including concrete produced as above.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 1 illustrates a method of making an activated class C fly ash-based cementitious material in accordance with an embodiment of the present disclosure.

FIG. 2 illustrates a method of making concrete in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Class C fly ash-based cementitious materials, concretes, and related techniques are disclosed. In accordance with some embodiments, an activated class C fly ash-based cementitious material may be produced by intergrinding class C fly ash (e.g., which has been classified to remove quartz and/or other contaminants and, thus, increase the reactive materials present), an activator, sodium citrate, borax, and a polycarboxylate material. The class C fly ash may have, for example, an amorphous glass content of about 60 wt % or more, a calcium oxide ($CaO_2$) content of about 20 wt % or more, and a quartz content of about 10 wt % or less. The activator may be, for example, a chemical which reacts with class C fly ash to form strätlingite structures therein when introduced with water. In at least some cases, the cementitious material may be provided as an all-in-one powder blend. In accordance with some embodiments, techniques disclosed herein may be utilized, for example, in providing a fast-setting flowable fill material. Numerous configurations and variations will be apparent in light of this disclosure.

General Overview

Through certain geopolymer reactions involving alkaline base chemicals or citrate ions, for instance, class C fly ash can be made to react and form bonds like cement bonds formed when making concrete. However, class C fly ash does not always have the proper mineralogy to make these geopolymer reactions occur on a consistent and repeatable basis. Consequently, class C fly ash may not be preferable for use in forming concrete structures (e.g., buildings, roads, tiles, etc.), for example, as compared to ordinary Portland cement (OPC)-based or calcium aluminate cement (CAC)-based cements. Also, although geopolymer concrete presents an opportunity to reduce costs in providing a high-performance cement, products made therewith tend to suffer from reliability problems, failing to set and gain strength because of various critical factors.

Thus, and in accordance with some embodiments of the present disclosure, class C fly ash-based cementitious materials, concretes, and related techniques are disclosed. In accordance with some embodiments, an activated class C fly ash-based cementitious material may be produced by inter-grinding class C fly ash (e.g., which has been classified to remove quartz and/or other contaminants and, thus, increase the reactive materials present), an activator, sodium citrate, borax, and a polycarboxylate material. The class C fly ash may have, for example, an amorphous glass content of about 60 wt % or more, a calcium oxide ($CaO_2$) content of about 20 wt % or more, and a quartz content of about 10 wt % or less. The activator may be, for example, a chemical which reacts with class C fly ash to form strätlingite structures therein when introduced with water. In at least some cases, the cementitious material may be provided as an all-in-one powder blend. In accordance with some embodiments, techniques disclosed herein may be utilized, for example, in providing a fast-setting flowable fill material.

In some cases, a concrete produced using techniques disclosed herein may exhibit compressive strengths in the range of about 2,000-3,000 psi after one day and 7,000+ psi after 28 days. As will be appreciated, obtaining strengths meeting or exceeding a 24-hour/3,000 psi target is unusual, especially for concrete samples produced and tested in accordance with ASTM protocols. In some cases, techniques disclosed herein may be utilized to produce a flowable class C fly ash-based material that has a strength of about 1,500 psi (in 1 day) and entrained air of about 4% (e.g., down from about 20%).

In accordance with some embodiments, techniques disclosed herein may be considered, in a general sense, a way for converting/manipulating class C fly ash to a cement-like material. As will be appreciated in light of this disclosure, the suitability of a given volume of class C fly ash for producing quality cementitious material may depend on a wide range of factors, including, for example: (1) the amount of amorphous glass in the class C fly ash; (2) the amount of calcium (Ca) in that amorphous glass; and (3) the amount of crystalline silicon dioxide ($SiO_2$) (e.g., silica/quartz) in the overall class C fly ash. As will be appreciated in light of this disclosure, it may be desirable, at least in some instances, to reduce the presence of quartz and/or other contaminants in the class C fly ash through one or more classification processes (e.g., electrostatic classification), as this may help to ensure a more consistent base material for making consistent end products (e.g., concrete and/or flowable fill). As will be further appreciated, the amount of quartz and/or other contaminants allowed to remain in the class C fly ash may be customized, as desired, for example, to achieve a given target quality for a given end product.

In accordance with some embodiments, use of techniques disclosed herein may result in concrete which exhibits enhanced durability as compared to other class C fly ash-based concrete products. In accordance with some embodiments, use of techniques disclosed herein may result in concrete which exhibits improved alkali resistance as compared to other class C fly ash-based concrete products. Also, techniques disclosed herein may be utilized, in accordance with some embodiments, to produce an eco-friendly "green" cement.

Activated Class C Fly Ash-Based Cementitious Material

FIG. 1 illustrates a method 1000 of making an activated class C fly ash-based cementitious material in accordance with an embodiment of the present disclosure. As can be seen, method 1000 may begin as in block 1002 with adding class C fly ash. As will be appreciated in light of this disclosure, the class C fly ash may be sourced as desired for a given target application or end-use. In some cases, the class C fly ash may be sourced, in part or in whole, from a coal-fired power station, though such sourcing is not required.

The amount of class C fly ash added may be customized, as desired for a given target application or end-use. In accordance with some embodiments, the class C fly ash may constitute about 90-99 wt % (e.g., about 90-93 wt %, about 93-96 wt %, about 96-99 wt %, or any other sub-range in the range of about 90-99 wt %) of a given mixture produced according to method 1000. In some cases, the class C fly ash may constitute between 94-96 wt % (±6 wt %). In some cases, the class C fly ash may constitute between 97.6-98.6 wt %.

As will be appreciated in light of this disclosure, the material composition of the class C fly ash may vary from source to source. In accordance with some embodiments, the class C fly ash may have an amorphous glass content in the range of about 50-70 wt % (e.g., about 50-55 wt %, about 55-60 wt %, about 60-65 wt %, about 65-70 wt %, or any other sub-range in the range of about 50-70 wt %). In some instances, the amorphous glass content of the class C fly ash may be about 60 wt % or more. In some instances, the amorphous glass content of the class C fly ash may be about 60 wt % (±5 wt %).

In accordance with some embodiments, the class C fly ash may have a calcium oxide ($CaO_2$) content in the range of about 15-30 wt % (e.g., about 15-20 wt %, about 20-25 wt %, about 25-30 wt %, or any other sub-range in the range of about 15-30 wt %). In some instances, the calcium oxide content of the class C fly ash may be in the range of about 20 wt % or more. In some instances, the calcium oxide content of the class C fly ash may be in the range of about 20 wt % (±5 wt %). In some instances, the class C fly ash may have a minimum calcium oxide content of about 20 wt %.

In accordance with some embodiments, the class C fly ash may have a quartz content in the range of about 5-20 wt % (e.g., about 5-10 wt %, about 10-15 wt %, about 15-20 wt %, or any other sub-range in the range of about 5-20 wt %). In some instances, the quartz content of the class C fly ash may be in the range of about 10 wt % or less. In some instances, the quartz content of the class C fly ash may be in the range of about 10 wt % (±5 wt %). In some instances, the class C fly ash may have a maximum quartz content of about 9 wt %.

In an example case, the class C fly ash may have a material composition as shown in Tables 1 and 2 below:

TABLE 1

| MgO | $Al_2O_3$ | $SiO_2$ | $SO_3$ | $K_2O$ | CaO | $Fe_2O_3$ | Na |
|---|---|---|---|---|---|---|---|
| 6.15 wt % | 16.46 wt % | 28.61 wt % | 2.8 wt % | 0.47 wt % | 28.57 wt % | 6.16 wt % | 2.06 wt % |

TABLE 2

| Amorphous Glass | Quartz | Lime | Mullite | Merwinite | Periclase |
|---|---|---|---|---|---|
| 63.01 wt % | 8.34 wt % | 2.05 wt % | 1.5 wt % | 14.73 wt % | 3.52 wt % |

Other suitable material compositions for the class C fly ash will depend on a given target application or end-use and will be apparent in light of this disclosure.

In some cases, it may be desirable to utilize screening and/or classifying (e.g., via an air classifier) to remove contaminants (e.g., quartz) from the class C fly ash which otherwise might reduce the reactivity of the class C fly ash to an activator (discussed below).

In any case, the particle size distribution of the class C fly ash may be customized, as desired for a given target application or end-use. For example, in some cases, the class C fly ash may have an average particle size in the range of about 10-20 μm (e.g., about 10-15 μm, about 15-20 μm, or any other sub-range in the range of about 10-20 μm). In some cases, the class C fly ash may have a maximum particle size in the range of about 50-90 μm (e.g., about 50-70 μm, about 70-90 μm, or any other sub-range in the range of about 50-90 μm). In some cases, the class C fly ash may have a minimum particle size in the range of about 1-5 μm (e.g., about 1-2.5 μm, about 2.5-5 μm, or any other sub-range in the range of about 1-5 μm).

In an example case, the class C fly ash may have a particle size distribution as shown in Table 3 below:

TABLE 3

| <10% | <25% | <50% | <75% | <90% | Mean |
|---|---|---|---|---|---|
| 1.685 μm | 4.976 μm | 12.26 μm | 25.56 μm | 42.71 μm | 17.42 μm |

Other suitable particle size ranges for the class C fly ash will depend on a given target application or end-use and will be apparent in light of this disclosure.

Method 1000 may continue as in block 1004 with adding one or more activators. In accordance with some embodiments, the activator(s) may be (or otherwise may include) chemical(s) which react with class C fly ash to form strätlingite structures therein when introduced with water. In accordance with some embodiments, the activator(s) may comprise, for example, a hydroxide, such as potassium hydroxide (KOH), and a grinding aid, such as triethanolamine (TEA). For instance, in accordance with some embodiments, the activator(s) may be (or otherwise may include) Jabrom 4FTC activator, produced by Jabrom Specialties, LLC (Katy, TX). In accordance with some embodiments, the activator(s) may be (or otherwise may include) Jabrom 4F200 activator, produced by Jabrom Specialties, LLC (Katy, TX). In some cases, a combination of Jabrom 4FTC and 4F200 may be utilized. In at least some cases, it may be desirable for the activator(s) to be in powder form, though this is not required. In at least some cases, the activator(s) may not include a citrate (e.g., sodium citrate).

The amount of activator added may be customized, as desired for a given target application or end-use. In accordance with some embodiments, the activator may constitute about 0.25-1.0 wt % (e.g., about 0.25-0.5 wt %, about 0.5-0.75 wt %, about 0.75-1.0 wt %, or any other sub-range in the range of about 0.25-1.0 wt %) of a given mixture produced according to method 1000. In some cases, the activator may constitute between 0.35-0.5 wt % (±0.15 wt %) of a given mixture produced according to method 1000. In accordance with some embodiments, about 6-8 oz. (±1 oz.) of activator per cubic yard of concrete may be utilized.

Method 1000 may continue as in block 1006 with adding sodium citrate ($Na_3C_6H_5O_7$). As will be appreciated in light of this disclosure, the combination of sodium citrate and class C fly ash may result in a geopolymer cement material, in accordance with some embodiments. As will be further appreciated, in at least some cases, the inclusion of sodium citrate may improve the workability/handling time of any concrete produced using the activated class C fly ash-based cementitious material. In at least some cases, it may be desirable for the sodium citrate to be in powder form, though this is not required.

The amount of sodium citrate added may be customized, as desired for a given target application or end-use. In accordance with some embodiments, the sodium citrate may constitute about 0.5-5.0 wt % (e.g., about 0.5-2.0 wt %, about 2.0-3.5 wt %, about 3.5-5.0 wt %, or any other sub-range in the range of about 0.5-5.0 wt %) of a given mixture produced according to method 1000. In some cases, the sodium citrate may constitute between 0.5-3.0 wt % (±0.3 wt %) of a given mixture produced according to method 1000. As will be appreciated in light of this disclosure, lower doses (e.g., less than 2 wt %) may yield longer concrete working times, whereas higher doses (e.g., 2 wt % or more) may yield shorter concrete working times.

Method 1000 may continue as in block 1008 with adding borax. As will be appreciated in light of this disclosure, in at least some cases, the inclusion of borax may improve the workability/handling time of any concrete produced using the activated class C fly ash-based cementitious material. In at least some cases, it may be desirable for the borax to be in powder form, though this is not required.

The amount of borax added may be customized, as desired for a given target application or end-use. In accordance with some embodiments, the borax may constitute about 0.1-0.5 wt % (e.g., about 0.1-0.2 wt %, about 0.2-0.3 wt %, about 0.3-0.4 wt %, about 0.4-0.5 wt %, or any other sub-range in the range of about 0.1-0.5 wt %) of a given mixture produced according to method 1000. In some cases, the borax may constitute about 0.35 wt % (±0.15 wt %) of a given mixture produced according to method 1000.

Method 1000 may continue as in block 1010 with adding one or more polycarboxylate materials. In general, the polycarboxylate material may be any of a wide range of polycarboxylate heteropolymer or copolymer (i.e., made from two monomers) materials. In accordance with some embodiments, the polycarboxylate material may be a high-range water reducer. In some instances, a single polycarboxylate material may be utilized, whereas in other instances, a combination of two or more different polycarboxylate materials may be utilized. In at least some cases, it may be desirable for the polycarboxylate material(s) to be in powder form, though this is not required.

The amount of polycarboxylate material(s) added may be customized, as desired for a given target application or end-use. In accordance with some embodiments, the polycarboxylate material(s) may constitute about 0.1-0.5 wt % (e.g., about 0.1-0.2 wt %, about 0.2-0.3 wt %, about 0.3-0.4 wt %, about 0.4-0.5 wt %, or any other sub-range in the range of about 0.1-0.5 wt %) of a given mixture produced according to method 1000. In some instances, the polycarboxylate material(s) may constitute between about 0.15-0.3 wt % (±0.05 wt %) of a given mixture produced according to method 1000.

In accordance with a specific example embodiment, the polycarboxylate material may be a polycarboxylate copolymer, such as Polycarboxylate-PCX CAS NO. 59233-52-2, available from WEGO Chemical and Mineral Corporation of Great Neck, New York, (hereinafter, WEGO Polycarboxylate-PCX), described as a high-range water reducer. WEGO Polycarboxylate-PCX has the following general chemical structure, where (1) M, Y, and X are leaving groups, (2) $R^1$-$R^4$ are aliphatic carbon chains, (3) ethylene oxide (EO) is a hydrophilic component, and (4) propylene oxide (PO) is a hydrophobic component:

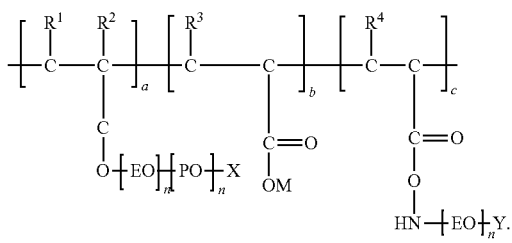

The hydrophilic EO component of WEGO Polycarboxylate-PCX has the following chemical structure:

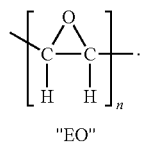

"EO"

Also, the hydrophobic PO component of WEGO Polycarboxylate-PCX has the following chemical structure:

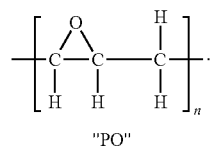

"PO"

For WEGO Polycarboxylate-PCX, variables a, b, c, and n may be whole integers greater than or equal to 1, and carbon bonds omitted from the illustrated chemical structure of WEGO Polycarboxylate-PCX may be bonded with hydrogen (H). Furthermore, it should be noted that the M, Y, and X leaving groups are proprietary constituents not known outside of WEGO Chemical and Mineral Corp. Nevertheless, even without knowing the M, Y, and X leaving groups, a person having ordinary skill in the art can utilize techniques disclosed herein, including making use of WEGO's commercially available Polycarboxylate-PCX, to produce products, as variously described herein, in accordance with some embodiments of the present disclosure. Also, it should be noted that one or more polycarboxylate materials of chemistry similar to that of WEGO polycarboxylate-PCX may be utilized additionally or alternatively, in accordance with some embodiments.

Method 1000 may continue as in block 1012 with intergrinding the (1) class C fly ash, (2) activator, (3) sodium citrate, (4) borax, and (5) polycarboxylate material(s). The noted materials may be interground with one another (e.g., all at once or in one or more intermediate combinations) to provide an activated class C fly ash-based cementitious material, in accordance with some embodiments. In some instances, a given material may have been ground down prior to beginning method 1000, though in other instances, the grinding down of a given material may occur (at least in part) at one or more points during method 1000. In accordance with some embodiments, prior to intergrinding, the class C fly ash may be classified to remove any one (or combination) of quartz, unreactive element(s), and other contaminant(s). In some cases, the class C fly ash may be screened at the 45 μm level or lower (e.g., 42 μm, 39 μm, 36 μm, 33 μm, or 30 μm).

Intergrinding may be performed utilizing any suitable grinding means, as will be apparent in light of this disclosure. For example, in accordance with some embodiments, intergrinding may be performed, in part or in whole, utilizing a mill with a grinding aid and media. The specific type of mill may be customized, as desired for a given target application or end-use. In some cases, the mill may be, for instance, a rotary mill, such as a ball mill. In accordance with some embodiments, intergrinding may be performed (in part or in whole) utilizing a mill configured as disclosed in U.S. Pat. No. 9,254,490 ("Process for Treating Fly Ash and a Rotary Mill Therefor"), the entire disclosure of which is herein incorporated by reference. In accordance with some embodiments, intergrinding may involve a grinding aid and media configured as disclosed in U.S. Pat. No. 9,254,490.

The duration of the intergrinding of the materials related to method 1000 may be customized, as desired for a given target application or end-use. For example, in accordance with some embodiments, intergrinding may be performed for about 10-30 minutes (e.g., ±5 minutes). As will be appreciated in light of this disclosure, the intergrinding of materials may be performed, for example, until a given target particle size distribution is achieved, at least in some instances. For example, in some instances, intergrinding may occur until a D90 particle size distribution in the range of about 30-70 μm (e.g., about 30-40 μm, about 40-50 μm, about 50-60 μm, about 60-70 μm, or any other sub-range in the range of about 30-70 μm) is achieved. In some cases, intergrinding may occur until a D90 particle size distribution of about 32-45 μm (e.g., ±5 μm) is achieved. In some cases, intergrinding may occur until a D90 particle size distribution of about 30-60 μm is achieved. In some cases, intergrinding may occur until a D90 particle size distribution of about 40-45 μm is achieved. In some cases, intergrinding may occur until a D90 particle size distribution of about 50-65 μm is achieved. Other suitable durations and target particle size distributions for the materials associated with method 1000 will depend on a given target application or end-use and will be apparent in light of this disclosure.

Concrete

FIG. 2 illustrates a method 2000 of making concrete in accordance with an embodiment of the present disclosure. As can be seen, method 2000 may begin as in block 2002 with adding the activated class C fly ash-based cementitious material produced via method 1000 (see FIG. 1). The amount of such cementitious material added may be customized, as desired for a given target application or end-use. In accordance with some embodiments, the cementitious material may constitute about 10-20 wt % (e.g., about 10-15 wt %, about 15-20 wt %, or any other sub-range in the range of about 10-20 wt %) of a given concrete produced according to method 2000. In some cases, the cementitious material may constitute between about 10.4-14.3 wt % (±2.0 wt %) of a given concrete produced according to method 2000. In some cases, the cementitious material may constitute between about 13.5-14.4 wt % (±2.0 wt %) of a given concrete produced according to method 2000. In some cases, the cementitious material may constitute between about 16.0-18.2 wt % (±2.0 wt %) of a given concrete produced according to method 2000. In some cases, the cementitious material may constitute between about 10.0-17.0 wt % (±2.0 wt %) of a given concrete produced according to method 2000. In some cases, the cementitious material may constitute between about 10.0-18.5 wt % (±2.0 wt %) of a given concrete produced according to method 2000.

Method 2000 may continue as in block 2004 with adding rock, sand, and water. In accordance with some embodiments, the rock material(s) may include, for example, ¾" limestone rock meeting ASTM C33 standards. In accordance with some embodiments, the sand material(s) may include, for example, screened sand meeting ASTM C33 standards. Other suitable types of rock and sand materials will depend on a given target application or end-use and will be apparent in light of this disclosure.

The amounts of rock and sand added may be customized, as desired for a given target application or end-use. In accordance with some embodiments, the rock may constitute about 45-55 wt % (e.g., about 45-50 wt %, about 50-55 wt %, or any other sub-range in the range of about 45-55 wt %) of a given concrete produced according to method 2000. In accordance with some embodiments, the sand may constitute about 45-55 wt % (e.g., about 45-50 wt %, about 50-55 wt %, or any other sub-range in the range of about 45-55 wt %) of a given concrete produced according to method 2000.

The water-cement (w/c) ratio for concrete produced according to method 2000 also may be customized, as desired for a given target application or end-use. In some cases, the w/c ratio may be in the range of about 0.2-0.4 (e.g., about 0.2-0.25, about 0.25-0.3, about 0.3-0.35, about 0.35-0.4 or any other sub-range in the range of about 0.25-0.4). In some cases, the w/c ratio may be in the range of about 0.25-0.38 (e.g., about 0.25-0.31, about 0.31-0.38, or any other sub-range in the range of about 0.25-0.38). In some cases, the w/c ratio may be in the range of about 0.2-0.33 (e.g., about 0.2-0.26, about 0.26-0.33, or any other sub-range in the range of about 0.2-0.33). In some cases, the w/c ratio may be in the range of about 0.23-0.3 or 0.23-0.4.

Method 2000 may continue as in block 2006 with mixing the (1) activated class C fly ash-based cementitious material, (2) rock, (3) sand, and (4) water. The noted materials may be mixed with one another (e.g., all at once or in one or more intermediate combinations) to provide a concrete including an activated class C fly ash-based cementitious material, in accordance with some embodiments. Mixing may be performed as typically done with concrete products. Moreover, the duration of the mixing of the materials related to method 2000 may be customized, as desired for a given target application or end-use. As will be appreciated in light of this disclosure, it may be desirable to ensure that mixing is curtailed with sufficient time to provide for pouring, forming, etc., the concrete as desired.

Example Concrete Batch #1

In accordance with an example embodiment, a first example 6.5-sack concrete batch including the following constituent materials was made: (1) 610 lbs. of activated class C fly ash-based cementitious material; (2) 1,603 lbs. of ¾" limestone rock meeting ASTM C33 standards; (3) 1,463 lbs. of screened sand meeting ASTM C33 standards; and (4) water. The water-cement (w/c) ratio of this batch was 0.26. The batch included about 3% entrained air.

The aforementioned activated class C fly ash-based cementitious material was mixed as follows: (1) 601 lbs. class C fly ash; (2) Jabrom 4FTC activator at about 8.0 oz./cwt of the class C fly ash; (3) 6.1 lbs. sodium citrate; (4) 2.14 lbs. borax; and (5) 277 g WEGO Polycarboxylate-PCX material.

Table 4 below tabulates measured compressive strengths for several 4"×8" cylinders of concrete cured at an ambient temperature in the range of about 73° F. (±3° F.) in conditions meeting ASTM standards. The concrete set up in about 5 min. (or less). The compressive strengths were obtained by breaking the cylinders.

TABLE 4

| Elapsed Time | Compressive Strength (psi) |
| --- | --- |
| 1 hr. | 840 |
| 3 hrs. | 1,030 |
| 1 day | 1,990 |
| 7 days | 2,720 |
| 28 days | 4,750 |

Example Concrete Batch #2

In accordance with an example embodiment, a second example 6.15-sack concrete batch including the following constituent materials was made: (1) 577 lbs. of activated class C fly ash-based cementitious material; (2) 1,612 lbs. of ¾" limestone rock meeting ASTM C33 standards; (3) 1,684 lbs. of screened sand meeting ASTM C33 standards; and (4) water. The water-cement (w/c) ratio of this batch was 0.3. The batch included about 3% entrained air.

The aforementioned activated class C fly ash-based cementitious material was mixed as follows: (1) 563 lbs. class C fly ash; (2) Jabrom 4FTC activator at about 8.0 oz./cwt of the class C fly ash; (3) 11.5 lbs. sodium citrate; (4) 2.02 lbs. borax; and (5) 261 g WEGO Polycarboxylate-PCX material.

Table 5 below tabulates measured compressive strengths for several 4"×8" cylinders of concrete cured at an ambient temperature in the range of about 73° F. (±3° F.) in conditions meeting ASTM standards. The concrete set up in about 15 min. (or less). The compressive strengths were obtained by breaking the cylinders.

TABLE 5

| Elapsed Time | Compressive Strength (psi) |
| --- | --- |
| 1 day | 2,870 |
| 3 days | 4,680 |
| 7 days | 5,360 |
| 14 days | 6,230 |
| 28 days | 6,980 |

Example Concrete Batch #3—Effect of Sodium Citrate Content

In accordance with an example embodiment, a third example 6.15-sack concrete batch including the following constituent materials was made: (1) activated class C fly ash-based cementitious material; (2) ¾" limestone rock meeting ASTM C33 standards; (3) screened sand meeting ASTM C33 standards; and (4) water. The water-cement (w/c) ratio of this batch was 0.25.

The aforementioned activated class C fly ash-based cementitious material was mixed as follows: (1) class C fly ash; (2) Jabrom 4FTC activator at about 8.0 oz./cwt of class C fly ash; (3) sodium citrate; (4) borax; and (5) WEGO Polycarboxylate-PCX material. Different amounts of sodium citrate were mixed in for different testing samples, as discussed in conjunction with Table 6 below.

Table 6 below tabulates, for a given amount of sodium citrate, measured (1) worktimes and (2) compressive strengths for several 4"×8" cylinders of concrete cured at an ambient temperature in the range of about 73° F. (±3° F.) in conditions meeting ASTM standards. The compressive strengths were obtained by breaking the cylinders.

TABLE 6

| Sodium Citrate (wt %) | Worktime (min) | Compressive Strength (psi) | | | | |
| --- | --- | --- | --- | --- | --- | --- |
| | | 1 Day | 3 Days | 7 Days | 14 Days | 28 Days |
| 0.0 | 5 | 1,880 | 2,510 | 3,150 | 4,020 | 4,180 |
| 0.5 | 50 | 2,560 | 3,730 | 4,730 | 5,090 | 5,990 |
| 1.0 | 40 | 2,150 | 3,060 | 4,690 | 5,820 | 6,030 |
| 2.0 | 10 | 3,330 | 4,330 | 5,920 | 6,110 | 6,900 |
| 3.0 | 7 | 2,570 | 3,460 | 5,360 | 5,720 | 7,420 |

Example Concrete Batch #4—Effect of Amorphous Glass and Quartz Content

In accordance with an example embodiment, a fourth example concrete batch including the following constituent materials was made: (1) activated class C fly ash-based cementitious material; (2) ¾" limestone rock meeting ASTM C33 standards; (3) screened sand meeting ASTM C33 standards; and (4) water. The water-cement (w/c) ratio of this batch was 0.26.

The aforementioned activated class C fly ash-based cementitious material was mixed as follows: (1) class C fly ash; (2) Jabrom 4FTC activator at about 8.0 oz./cwt of class C fly ash; (3) sodium citrate; (4) borax; and (5) WEGO Polycarboxylate-PCX material. Class C fly ash volumes of differing material composition were mixed in for different testing samples, as discussed in conjunction with Table 7 below.

Table 7 below tabulates, for a given amount of amorphous glass and quartz present in the class C fly ash, measured (1) D90 particle size distributions and (2) compressive strengths for several 2"×2" cubes of concrete cured at an ambient temperature in the range of about 73° F. (±3° F.) in conditions meeting ASTM standards. The compressive strengths were obtained by breaking the cubes.

TABLE 7

| Amorphous Glass (wt %) | Quartz (wt %) | D90 PSD (μm) | Compressive Strength (psi) | | | | |
| --- | --- | --- | --- | --- | --- | --- | --- |
| | | | 1 Day | 3 Days | 7 days | 28 Days | 56 Days |
| 66.76 | 8.58 | 56.8 | 1,680 | 2,947 | 3,710 | 6,390 | 6,580 |
| 64.89 | 9.49 | 65.0 | 1,750 | 3,435 | 3,820 | 6,010 | 6,120 |
| 60.37 | 12.9 | 79.4 | 1,050 | 2,157 | 2,960 | 4,460 | 4,650 |
| 56.64 | 13.65 | 111.2 | 1,180 | 1,970 | 1,970 | 3,360 | 3,600 |
| 53.63 | 18.59 | 137.9 | 510 | 967 | 1,360 | 1,470 | 1,570 |

Example Flowable Fill Batch #1

In accordance with an example embodiment, a first flowable fill batch including the following constituent materials was made: (1) class C fly ash; (2) liquid Jabrom 4FTC activator; and (3) water. The liquid Jabrom 4FTC activator was mixed into water at 6-8 oz./cwt, and the resultant volume was mixed with the class C fly ash. The mixture reacted within about 15-25 minutes to cause it to set up (e.g., to where one could walk on it) at an ambient temperature of about 75° F.

Example Flowable Fill Batch #2

In accordance with an example embodiment, a second flowable fill batch including the following constituent materials was made: (1) about 470 lbs. of class C fly ash; (2) about 2,400-2,800 lbs. of sand; (3) 6-8 oz. of Jabrom 4FTC activator; and (4) water. The water-powder ratio was in the range of about 0.3-0.6. The entrained air content was about 15-25%. The batch made about one cubic yard of flowable fill that (1) set up in 20-30 min. and (2) did not exceed 250 psi in compressive strength.

Example Flowable Fill Batch #3

In accordance with an example embodiment, a third flowable fill batch including the following constituent materials was made: about 400 lbs. of powder mix including powdered Jabrom 4FTC activator interground with raw class C fly ash at about 9 lbs. per ton of class C fly ash and then mixed with sand and water at about 400 lbs. of powder per cubic yard with the remaining amount of the cubic yard including low-moisture (e.g., less than about 2% moisture) sand. The water-powder ratio was about 0.35. The entrained air content was about 15%.

Table 8 below tabulates measured compressive strengths for several 4"×8" cylinders cured at an ambient temperature in the range of about 72° F. (±3° F.) in conditions meeting ASTM standards. The flowable fill set up in about 15 min. (or less). The compressive strengths were obtained by breaking the cylinders.

TABLE 8

| Sample # | Elapsed Time | Compressive Strength (psi) |
|---|---|---|
| 1A | 1 day | 4 |
| 1B | 1 day | 8 |
| 1C | 7 days | 32 |
| 1D | 7 days | 56 |
| 1E | 28 days | 64 |
| 1F | 28 days | 72 |

Example Flowable Fill Batch #4

In accordance with an example embodiment, a fourth flowable fill batch including the following constituent materials was made: about 400 lbs. of powder mix including powdered Jabrom 4FTC activator interground with raw class C fly ash at about 9 lbs. per ton of class C fly ash and then mixed with sand and water at about 400 lbs. of powder per cubic yard with the remaining amount of the cubic yard including low-moisture (e.g., less than about 2% moisture) sand. The water-powder ratio was about 0.35. The entrained air content was about 15%.

Table 9 below tabulates measured compressive strengths for several 4"×8" cylinders cured at an ambient temperature in the range of about 72° F. (±3° F.) in conditions meeting ASTM standards. The flowable fill set up in about 15 min. (or less). The compressive strengths were obtained by breaking the cylinders.

TABLE 9

| Sample # | Elapsed Time | Compressive Strength (psi) |
|---|---|---|
| 2A | 1 day | 12 |
| 2B | 1 day | 16 |
| 2C | 7 days | 72 |
| 2D | 7 days | 80 |
| 2E | 28 days | 80 |
| 2F | 28 days | 88 |

Example Flowable Fill Batch #5

In accordance with an example embodiment, a fifth flowable fill batch including the following constituent materials was made: about 400 lbs. of powder mix including powdered Jabrom 4FTC activator interground with raw class C fly ash at about 9 lbs. per ton of class C fly ash and then mixed with sand and water at about 400 lbs. of powder per cubic yard with the remaining amount of the cubic yard including low-moisture (e.g., less than about 2% moisture) sand. The water-powder ratio was about 0.35. The entrained air content was about 12%.

Table 10 below tabulates measured compressive strengths for several 4"×8" cylinders cured at an ambient temperature in the range of about 73° F. (±3° F.) in conditions meeting ASTM standards. The flowable fill set up in about 15 min. (or less). The compressive strengths were obtained by breaking the cylinders.

TABLE 10

| Sample # | Elapsed Time | Compressive Strength (psi) |
|---|---|---|
| 3A | 1 day | 40 |
| 3B | 1 day | 40 |
| 3C | 7 days | 64 |
| 3D | 7 days | 72 |
| 3E | 28 days | 88 |
| 3F | 28 days | 96 |

Example Concrete Batch #5

In accordance with an example embodiment, a fifth example concrete batch including the following constituent materials was made: (1) flowable fill, provided as described above, with about 577 lbs. of powder treated, as described above, with under 45-μm class C fly ash, borax, and sodium citrate, as described above; (2) coarse aggregate meeting ASTM C33 standards; (3) sand meeting ASTM C33 standards; and (4) water. The water-powder ratio was about 0.35. The entrained air content was about 4%.

Table 11 below tabulates measured compressive strengths for several 4"×8" cylinders of concrete cured at an ambient temperature in the range of about 75° F. (±3° F.) in conditions meeting ASTM standards. The concrete set up in about 15 min. (or less). The compressive strengths were obtained by breaking the cylinders.

TABLE 11

| Sample # | Elapsed Time | Compressive Strength (psi) |
|---|---|---|
| 4A | 6 hours | 1,910 |
| 4B | 6 hours | 1,946 |
| 4C | 8 hours | 2,511 |
| 4D | 8 hours | 2,794 |
| 4E | 1 day | 3,962 |
| 4F | 1 day | 4,103 |
| 4G | 28 days | 6,438 |
| 4H | 28 days | 6,827 |

Analysis & Conclusions

The data of Tables 4-5, for instance, show that techniques disclosed herein may be used, in accordance with some embodiments, to produce concrete having a compressive strength in the range of about 2,000-3,000 psi after one day and 7,000+ psi after 28 days.

The data of Table 6, for instance, show that techniques disclosed herein may be used, in accordance with some embodiments, to produce concrete having a working time of up to about 50 minutes.

The data of Table 7, for instance, show that variations in quartz content may impact the quality of the raw class C fly ash. For example, the presence of quartz may cause fluctuations in compressive strength as it varies in amounts in the raw class C fly ash. As such, it may be beneficial, at least in some instances, to reduce quartz content (e.g., by classifying to remove quartz and/or other contaminants). The pozzolanic performance of the class C fly ash may depend, at least in part, on how free the source coal is from inert materials (e.g., sand/quartz). Reducing the quartz (e.g., by reducing the sand content) may permit the reactive part of the class C fly ash (e.g., the amorphous glass) to work more effectively. The class C fly ash also may benefit from reduced amounts of mullite. In at least some instances, when the raw class C fly ash is classified to reduce quartz content, the amount of amorphous glass and the amount of merwinite ($Ca_3Mg(SiO_4)_2$) present in the class C fly ash may increase. In at least some such cases, the presence of a magnesium compound, such as merwinite, may help to stabilize geopolymer reactions. In some cases, classifying class C fly ash at 45 μm (−325 mesh) top size may result in the amount of merwinite increasing from about 8.7% (at +325 mesh) to about 16.4% (at −325 mesh).

The data of Tables 7-11, for instance, also show that a flowable fill which sets rapidly yet does not reach high strengths may be provided. The flowable fill, including sand, class C fly ash, water, and Jabrom activator(s) (e.g., either in the water or interground using a dry absorbent), may be used, for example, to fill in an area and set rapidly yet still be removable/recoverable with ease later (e.g., a year or more). In accordance with some embodiments, the air content of the flowable fill may be, for example, in the range of about 10-25% (e.g., about 10-15%, about 15-20%, about 20-25%, or any other sub-range in the range of about 10-25%). In some cases, the air content of the flowable fill may be, for example, between about 15-22% (±3%). In accordance with some embodiments, the flowable fill may have a compressive strength in the range of about 70-100 psi at 28 days (e.g., about 70-80 psi, about 80-90 psi, about 90-100 psi, or any other sub-range in the range of about 70-100 psi). Greater or lesser compressive strength ranges may be provided, in accordance with other embodiments. As will be appreciated in light of this disclosure, it may be desirable to ensure that the compressive strength remains below 300 psi, for example, based on a given target removability index.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A method comprising:
   producing a class C fly ash-based cementitious mixture comprising:
      class C fly ash;
      an activator which reacts with the class C fly ash to form strätlingite structures therein when introduced with water, wherein the activator comprises potassium hydroxide (KOH) and triethanolamine (TEA);
      sodium citrate;
      borax; and
      a polycarboxylate material.

2. The method of claim 1, wherein the class C fly ash constitutes about 90-99 wt % of the class C fly ash-based cementitious mixture.

3. The method of claim 1, wherein the class C fly ash has:
   an amorphous glass content in the range of 60 wt % or more;
   a calcium oxide ($CaO_2$) content in the range of 20 wt % or more; and
   a quartz content in the range of 10 wt % or less.

4. The method of claim 1, wherein the class C fly ash has:
   an amorphous glass content in the range of about 50-70 wt %;
   a calcium oxide ($CaO_2$) content in the range of about 15-30 wt %; and
   a quartz content in the range of about 5-20 wt %.

5. The method of claim 1, wherein the activator constitutes about 0.25-1.0 wt % of the class C fly ash-based cementitious mixture.

6. The method of claim 1, wherein the sodium citrate constitutes about 0.5-5.0 wt % of the class C fly ash-based cementitious mixture.

7. The method of claim 1, wherein the borax constitutes about 0.1-0.5 wt % of the class C fly ash-based cementitious mixture.

8. The method of claim 1, wherein producing the class C fly ash-based cementitious mixture involves intergrinding the class C fly ash, the activator, the sodium citrate, the borax, and the polycarboxylate material.

9. The method of claim 8, wherein the intergrinding is performed for about 10±5 minutes.

10. The method of claim 8, wherein the intergrinding is performed until a D90 particle size distribution in the range of about 30-60 μm is achieved for the class C fly ash-based cementitious mixture.

11. The method of claim 8, wherein prior to the intergrinding, the class C fly ash is classified to remove at least one of quartz, an unreactive element, and a contaminant.

12. A method comprising:
    producing a concrete comprising:
       the class C fly ash-based cementitious mixture produced according to claim 1;
       water; and
       at least one of rock and sand.

13. The method of claim 12, wherein the class C fly ash-based cementitious mixture constitutes about 10-17 wt % of the concrete.

14. The method of claim 12, wherein the concrete has a water-cement (w/c) ratio in the range of about 0.23-0.4.

15. The method of claim 12, wherein the concrete has a water-cement (w/c) ratio in the range of about 0.23-0.3.

16. A concrete product comprising concrete produced according to claim 12.

17. A method comprising:
    producing a class C fly ash-based cementitious mixture comprising:
       class C fly ash having:
          an amorphous glass content in the range of 60 wt % or more;
          a calcium oxide ($CaO_2$) content in the range of 20 wt % or more; and
          a quartz content in the range of 10 wt % or less;
       an activator which reacts with the class C fly ash to form strätlingite structures therein when introduced with water, wherein the activator comprises potassium hydroxide (KOH) and triethanolamine (TEA);
       sodium citrate;
       borax; and
       a polycarboxylate material;
    wherein producing the class C fly ash-based cementitious mixture involves:
       classifying the class C fly ash to remove at least one of quartz, an unreactive element, and a contaminant; and
       intergrinding the class C fly ash, the activator, the sodium citrate, the borax, and the polycarboxylate material.

18. A method comprising:
producing a concrete comprising:
 the class C fly ash-based cementitious mixture produced according to claim 17;
 water; and
 at least one of rock and sand;
 wherein the concrete has a water-cement (w/c) ratio in the range of about 0.23-0.3.

19. A concrete product comprising concrete produced according to claim 18.

* * * * *